United States Patent [19]

Lovett

[11] Patent Number: 5,136,884
[45] Date of Patent: Aug. 11, 1992

[54] MAGNETIC SIGHT GAGE SENSOR

[75] Inventor: Rodley C. Lovett, Keene, Tex.

[73] Assignee: MTS Systems Corporation, Minneapolis, Minn.

[21] Appl. No.: 686,828

[22] Filed: Apr. 17, 1991

[51] Int. Cl.⁵ .................. G01F 23/30; G01F 23/64; G01F 23/72
[52] U.S. Cl. ...................... 73/313; 73/314; 73/319; 73/290 V; 73/DIG. 5; 73/DIG. 2; 333/148; 324/207.13; 324/207.24
[58] Field of Search ................ 73/314, 319, DIG. 2, 73/DIG. 5, 290 V, 313; 333/148; 324/207.13, 207.24

[56] References Cited

U.S. PATENT DOCUMENTS

| | | | |
|---|---|---|---|
| 2,685,797 | 8/1954 | Morschel | 73/319 |
| 4,194,397 | 3/1980 | Yasuda | 73/319 |
| 4,483,193 | 11/1984 | Bonetti | 73/319 |
| 4,512,190 | 4/1985 | Sledmere | 73/319 |
| 4,839,590 | 6/1989 | Koski et al. | 73/314 |
| 4,870,862 | 10/1989 | Bonetti | 73/319 |
| 4,943,773 | 7/1990 | Koski et al. | 73/314 |
| 4,952,873 | 8/1990 | Tellerman | 73/319 |
| 5,017,867 | 5/1991 | Dumais et al. | 73/314 |

FOREIGN PATENT DOCUMENTS 0295717 1/1954 Switzerland .................. 73/319

OTHER PUBLICATIONS

K-Tek Corporation Data Sheet 3510 for "Compact Remote Level Transmitter for External Chamber Mounting", Model RLT-200/1290, Baton Rouge, LA (no date).
K-Tek Corporation Brochure for KM 26 Magnetic Liquid Level Indicator. (no date).

Primary Examiner—William A. Cuchlinski, Jr.
Assistant Examiner—Diego F. F. Gutierrez
Attorney, Agent, or Firm—Kinney & Lange

[57] ABSTRACT

A magnetic sight gage sensor comprises a sensor for determining the liquid level in a process vessel utilizing a magnetic float on the interior of a tube. The tube is connected at different levels to a process vessel and contains a liquid that is maintained at the same level as the liquid inside the process vessel. A magnetostrictive displacement transducer is coupled to the tube or sight glass on the exterior of such glass, so it is out of the process fluid. The transducer provides signals indicating the position of the float relative to a reference position on the transducer. The tube or sight glass is made of a non-magnetic material in order to allow transmission of the magnetic field from the float to the transducer.

3 Claims, 2 Drawing Sheets

MAGNETIC SIGHT GAGE SENSOR

BACKGROUND OF THE INVENTION

The present invention relates to the use of a precision displacement transducer for determining levels of liquid in a process vessel by mounting a magnetostrictive transducer onto the exterior of a sight glass having a liquid in communication with the liquid inside the process vessel, and a float that floats at the level of the liquid. The float contains a magnet that will provide a magnetic field that serves as the input signal for determining distances of the displacement transducer.

Various sight gage liquid level indicators have been advanced, including liquid level indicators that carry a magnet on the inside of a sight glass or tube, and which in turn cause a magnetically coupled indicator to move in a separate glass tube outside of the sight glass to establish a visual indication of liquid level in the process vessel. In some instances, the magnetic float has been utilized for continuous remote level transmission using electric signals that provide an output as a function of the float movement.

However, these products are imprecise, and do not provide an accurate continuous analog output of liquid levels for constant monitoring, and for inputs into various process controls.

While the magnetostrictive transducers have been used with floats that surround the sensing portions of the transducers, the present invention keeps all of the transducer components away from the process liquid while providing the benefits of precise and continuous indications of liquid levels.

SUMMARY OF THE INVENTION

The present invention relates to a magnetic sight gage sensor utilizing a magnetostrictive displacement transducer positioned adjacent a bypass tube or column partially filled with liquid that rises and falls in accordance with the liquid level in a separate large process vessel, and in which a float carrying a magnet is placed. The magnetostrictive sensor will be affected by the magnetic field passing through a magnetic transmissive material wall housing the float, and in accordance with known principles will provide a precise displacement signal from a reference point to determine, on a continuous basis, the level of liquid in the process vessel. The installation is simple, low cost, and the sensitive parts of the assembly are maintained isolated from corrosive, high temperature and high pressure process fluids. The invention can be applied to existing sight gages, which have magnetic floats on the interior, to greatly enhance the accuracy of liquid level determination, and the response time of the sensor for very precise control of processes.

DETAILED DESCRIPTION OF THE PREFERRED EMBODIMENT

Figure 1:
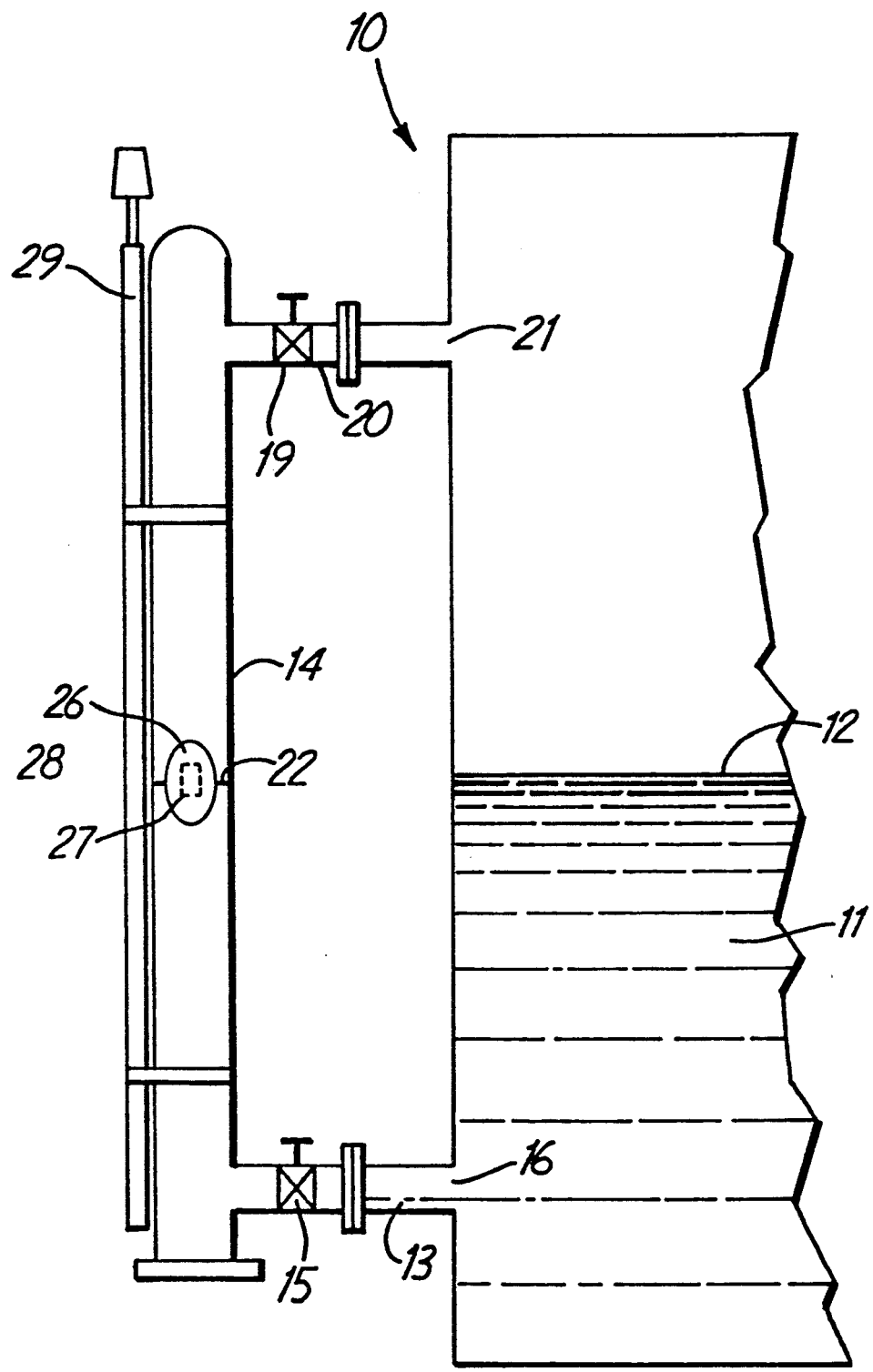
FIG. 1 is a schematic representation of a process vessel having a magnetic sight gage sensor known in the prior art installed thereon.

Referring to FIG. 1, a process vessel or tank indicated schematically at 10 is used for containing a process fluid used in an industrial process. The liquid indicated at 11 inside the tank has a level 12. The level of the liquid in the tank is an important factor in controlling processes. Besides requiring a measurement of the current level in the tank, it is also necessary to know how fast the level is increasing or decreasing in order to provide for satisfactory control across a range of process operations.

The tank 10 has a conduit or fitting 13 near the bottom that is coupled to a bypass or tubular stand pipe 14. A suitable blocking valve 15 can be provided in conduit 13, and of course suitable couplings can also be made. Stand pipe 14 is connected at its upper end with a conduit 20 to a port 21. In the preferred embodiment, conduit 20 also includes a blocking valve 19. As illustrated, port 21 is above the normal level of liquid 11 in tank 10 while port 16, at the bottom of stand pipe 14, is below the liquid level 12. When valves 15 and 19 are open allowing fluid communication between stand pipe 14 and tank 10, a level indicated at 22 is established in the stand pipe 14 that will correspond to the level 12 of the liquid 11 in tank 10.

This type of a stand pipe arrangement for determining levels of tank is well known and, in addition, it is well known to use a float 26 inside the tube or stand pipe 14 with a magnet 27 within the float. The magnet 27 generates a magnetic field, and in conventional operations, is used for moving a magnetic material indicator shown schematically at 28 inside a sealed glass tube 29 to provide a visual indication of level. This arrangement, however, does not provide signals to various process controllers, nor is it very accurate because of mechanical friction of the indicator 28 in tube 29.

Prior devices have been used for providing a continuous read-out of liquid level. However, these devices are either inaccurate or not as responsive as needed.

Figure 2:
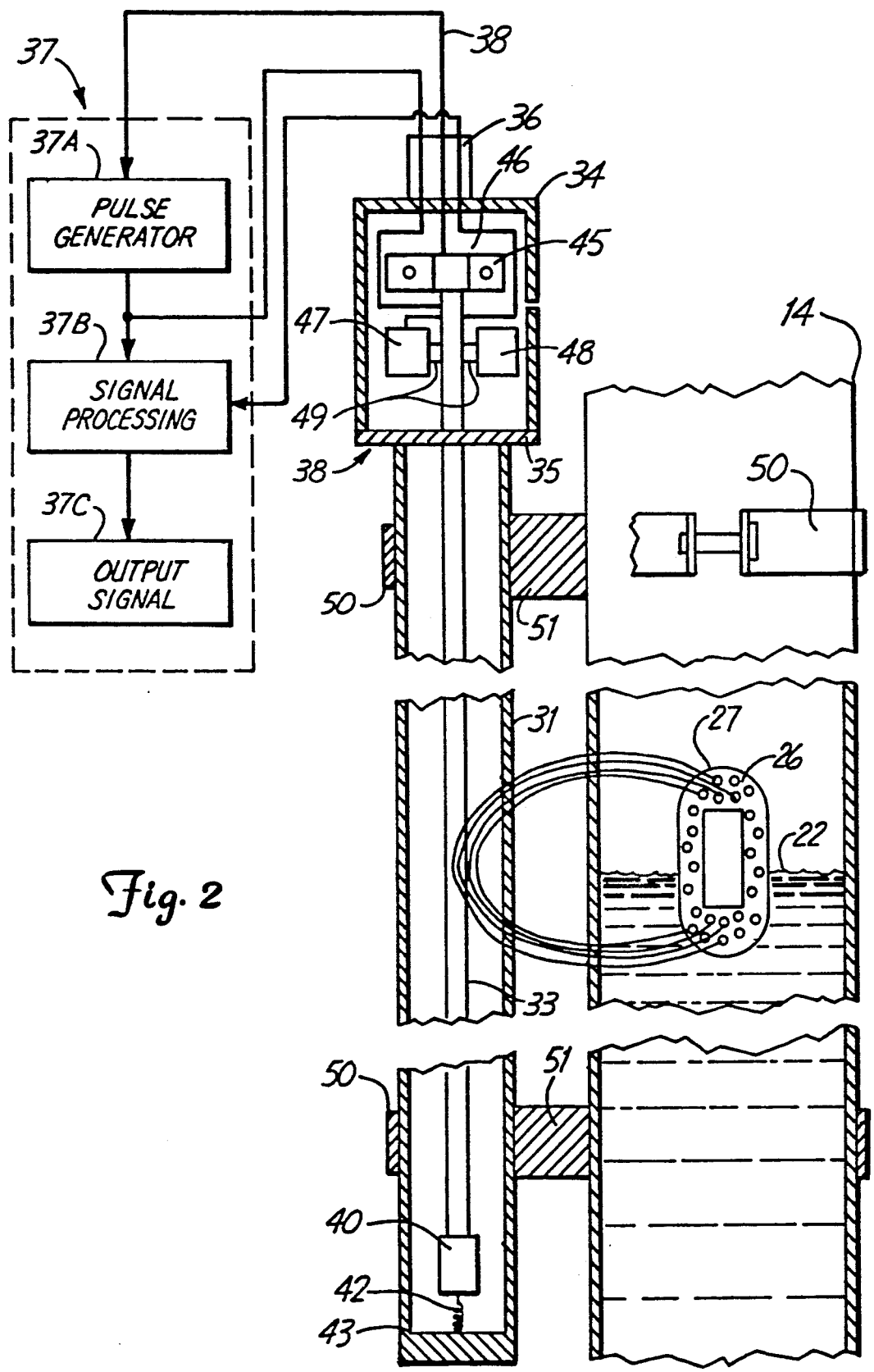
FIG. 2 is an enlarged schematic sectional view of a float and linear displacement transducer used in the present invention.

In the present invention as illustrated in FIG. 2, a magnetostrictive transducer is indicated generally at 30. The magnetostrictive transducer 30 shown is of the type described and claimed in U.S. Pat. No. 4,952,873 which can be referred to for details of construction. Transducer 30 comprises an outer protective tube 31 which houses an interior wave guide 33. The protective tube 31 is supported on a mounting head 34. The mounting head 34 includes a mounting flange 35 that supports, or is supported by the protective tube 31, and the head 34 has a connector 36 thereon for connecting to external circuitry shown generally at 37. The wave guide 33 has its outer or remote end anchored to the tube 31 through a link 40, and a tension spring 42 that in turn is also attached to an end plug or plate 43. The wave guide 33 is maintained under some tension. The base end of the wave guide at the head 34 is mounted in a mounting block 45, such as by soldering the wave guide into the block. The mounting block 45 is supported onto an end plate or bracket 46 in a suitable manner which in turn is fixed to the flange 35.

Magnet 27 is oriented within float 26 such that the magnetic field generated by the magnet 27 passes through the tube 14, and the protective tube 31, which are both constructed from nonmagnetic materials, and further passes through wave guide 33. Electric current pulses are sent out along the wave guide 33 from a pulse generator 37A forming a portion of the electronic circuit 37, and a return line 38 provides for a current return. The pulse generator 37A provides a stream of pulses, each of which is also provided to a signal processing circuit 37B for timing purposes. When the current pulse travels down the wave guide 33 in direction from the mounting block 45, the current pulse provides a field passing through the wave guide and when this field intercepts the magnetic field from magnet 27, it will induce a torsional loading into the wave guide 33 under known principles and thus provide a torsional strain wave pulse in the wave guide. The strain wave is a twisting of the wave guide 33 which is transmitted through the wave guide back toward the mounting block 45. As the torsional pulse moves between the two portions of a mode converter shown at 47 and 48, respectively, the movement of provided sensing tapes indicated at 49 will be sensed to generate an electric signal back to the processing circuit 37B. By proper comparison of the time of start of a particular current pulse and the time of return of the sonic torsional strain wave pulse back along wave guide 33 a distance of the magnet 27 from the mode converter center line will be obtained as an output signal 37C through the circuitry 37.

This arrangement is fully described in U.S. Pat. No. 4,952,873.

In the present invention, the protective tube 31 is suitably supported onto the tube 14 through the use of suitable clamps indicated at 50. A standoff or support block 51 can be placed between the side wall of the tube 14 and the side wall of the protective tube 31, and then a band-type clamp 50 passed around the outside of the tube to clamp it securely to the tube 14. These straps 50 can be used in two or more places as shown.

The output signal 37C will represent the level 12 of the liquid 11 in t he process vessel 10. The level 22 inside the tube 14 and the level 12 of the process vessel liquid will remain the same, as long as the valves in conduits 20 and 13 remain open and the magnet 27 will provide the magnetic field to the wave guide 33 as described above to provide a precise liquid level indication relative to a reference level at the head of the transducer 34 so that a continuous, very accurate measurement of liquid level can be obtained. The magnetostrictive principles are particularly adapted to use in the present installation, inasmuch as the wave guide 33 and its protective tube 31 can be mounted on the exterior of the tube 14, and do not have to be within the corrosive process fluid or subjected to the temperatures and pressures that may be present in the process vessel 10.

The arrangement permits the sensor output to be used in two-wire 4–20 ma transmitters for continuous, real time control.

Although the present invention has been described with reference to preferred embodiments, workers skilled in the art will recognize that changes may be made in form and detail without departing from the spirit and scope of the invention.

What is claimed is:

1. A magnetic sight gage sensor for a vessel having a bypass tube made of magnetic transmissive material connected to the vessel in such a manner that the level of a liquid in the bypass tube corresponds to the level of liquid in the vessel, magnet means floating in the bypass tube at a level dependent on the level of liquid in the vessel, wherein the improvement comprises a magnetostrictive transducer mounted outside of the vessel on the exterior of said bypass tube and in proximity thereto, said magnetostrictive transducer comprising a protective tube made of magnetic transmissive material, a wave guide which passes adjacent to and is spaced from said magnet means and is mounted in said protective tube, means for providing electrical pulses along said wave guide and for sensing return pulses caused by interference of magnetic fields carried by the wave guide as a result of the electrical pulses and the magnetic field of the magnet means to provide an indication of the level of the magnet means relative to a reference.

2. The sight gage sensor of claim 1 wherein the floating magnet means comprises a float member and a magnet supported in the float member.

3. The sight gate sensor of claim 1 wherein said protective tube is directly supported on and secured to said bypass tube.

* * * * *